Patented Feb. 6, 1934

1,946,003

UNITED STATES PATENT OFFICE 1,946,003

TREATMENT OF LATEX

Robert L. Sibley, Nitro, W. Va., assignor to The Rubber Service Laboratories Company, Akron, Ohio, a corporation of Ohio No Drawing. Application March 23, 1933
Serial No. 662,393

24 Claims. (Cl. 18—50)

The present invention relates to the treatment of rubber latex. More particularly the present invention relates to improving the wetting, penetrating and analogous properties of rubber latex when employed, for example, as impregnating media for porous materials such as textile fabrics, cork, paper and the like.

Heretofore, the use of latex as impregnating media for porous materials such as textile fabrics, cork, paper and the like has been limited owing to the slowness with which the latex was absorbed thereby. It has now been found according to the present invention that the wetting, penetrating and like properties of latex have been markedly increased and consequently the time of absorption thereof in textile fabric and the like markedly decreased, by incorporating therein a small proportion of a new and improved class of materials.

The new class of materials possessing these desirable wetting and penetrating properties comprise the soluble salts of the sulfuric acid derivatives of the reaction products of an alcohol and a hydroxy substituted diaryl, as for example an alkali salt or ammonium salt of a sulfuric acid derivative of the reaction product of normal butyl alcohol and a mixture of ortho and para hydroxy diphenyl.

Substances which may be employed as wetting and penetrating agents in accordance with the teachings of the present invention and falling within the scope thereof are the soluble salts, as for example the sodium salts, of the sulfuric acid derivatives of the following reaction products: reaction product of normal butyl alcohol and a mixture of substantially 85% ortho hydroxy diphenyl and substantially 15% para hydroxy diphenyl; reaction product of iso-propyl alcohol and a mixture of substantially 85% ortho hydroxy diphenyl and substantially 15% para hydroxy diphenyl; reaction product of normal butyl alcohol and para hydroxy diphenyl; reaction product of normal butyl alcohol and ortho hydroxy diphenyl; reaction product of iso-butyl alcohol and a mixture of substantially 85% ortho hydroxy diphenyl and substantially 15% para hydroxy diphenyl; reaction product of normal amyl alcohol and a mixture of substantially 85% ortho hydroxy diphenyl and substantially 15% para hydroxy diphenyl; reaction product of cyclohexanol and a mixture of substantially 85% ortho hydroxy diphenyl and substantially 15% para hydroxy diphenyl; reaction product of octyl alcohol and a mixture of substantially 85% ortho hydroxy diphenyl and substantially 15% para hydroxy diphenyl; reaction products of alpha dinaphthol and beta dinapthol with normal butyl alcohol, iso-propyl alcohol, iso-butyl alcohol, normal amyl alcohol, iso-amyl alcohol, cyclohexanol, octyl alcohol, cetyl alcohol and benzyl alcohol respectively; reaction products of benzyl alpha naphthol and benzyl beta naphthol with normal butyl alcohol, iso-butyl alcohol, normal propyl alcohol, iso-propyl alcohol, normal amyl alcohol, iso-amyl alcohol, cyclohexanol, octyl alcohol, cetyl alcohol and benzyl alcohol respectively; reaction products of alpha alcohol respectively; reaction products of alpha naphthyl phenol and beta naphthyl phenol with normal butyl alcohol, iso-butyl alcohol, normal propyl alcohol, iso-propyl alcohol, normal amyl alcohol, iso-amyl alcohol, cyclohexanol, octyl alcohol, cetyl alcohol and benzyl alcohol respectively.

The examples hereinbefore set forth are conveniently prepared according to the process disclosed in my co-pending application, Serial No. 639,149, filed October 22, 1932.

The following examples are to be understood as specific embodiments of the invention and not limitations thereof.

*Example I*

100 parts of 20% latex were mixed by stirring or agitation with 1 part of the sodium salt of the sulfuric acid derivative of the reaction product of substantially two molecular proportions of butyl alcohol and substantially one molecular proportion of a mixture of substantially 85% ortho hydroxy diphenyl and substantially 15% para hydroxy diphenyl, prepared as described in my co-pending application, Serial No. 639,149, filed October 22, 1932. On the surface of the latex solution thus obtained there was placed a strand of cotton fabric one inch in length, such as is employed in the ply stocks of an automobile pneumatic rubber tire. The time required for the strand of fabric to be wet and impregnated by the latex solution so that it sank below the surface of the liquid was 16.7 seconds. This may be called the wetting out time. A test carried out in exactly the same manner, with the exception that no wetting agent was added to the latex, shows substantially no wetting of the fabric by the latex.

If convenient or desirable, the preferred class of materials may be employed in conjunction with other wetting agents and/or a solvent for the wetting agent.

Thus, the sodium salt of the sulfuric acid derivative of the reaction product of normal butyl alcohol and a mixture of substantially 85% ortho and substantially 15% para hydroxy diphenyl, prepared as described above, has been employed in conjunction with iso amyl alcohol, butyl alcohol, pine oil, "Turkey red" oil, ethylene glycol, mono butyl ether and furfuryl alcohol and the resulting products found to produce a very marked increase in the wetting and/or impregnation of fabrics with latex. A 50% aqueous solution of the sodium salt of the sulfuric acid derivative of the reaction product of normal butyl alcohol and a mixture of 85% ortho and 15% para hydroxy diphenyl to which has been added substantially 3 to 5% of normal butyl alcohol has been found to be especially desirable as a wetting and penetrating agent for impregnating latex in fabrics.

*Example II*

As a further specific embodiment of the invention 100 parts of 20% latex were mixed by stirring or agitation with 1 part of the sodium salt of the sulfuric acid derivative of the reaction product of substantially two molecular proportions of normal amyl alcohol and substantially one molecular proportion of a mixture of substantially 85% ortho and substantially 15% para hydroxy diphenyl. A test carried out as in Example I showed the latex to wet the fabric in 5 seconds.

The sodium salt of the sulfuric acid derivative of the reaction product of ortho hydroxy diphenyl and normal butyl alcohol and the sodium salt of the sulfuric acid derivative of the reaction product of para hydroxy diphenyl and normal butyl alcohol prepared according to the process hereinbefore described, as further specific examples of the present invention, have been tested in the manner set forth in Examples I and II and found to possess the wetting and penetrating qualities typical of the class. Furthermore, other mixtures of ortho hydroxy diphenyl and para hydroxy diphenyl, than a mixture of 85% ortho and 15% para hydroxy diphenyl, have been reacted with an alcohol and the reaction product treated with sulfuric acid to form wetting agents for latex. Thus one such product comprising the sodium salt of the sulfuric acid derivative of the reaction product of normal butyl alcohol and a mixture of substantially 95% ortho hydroxy diphenyl and substantially 5% para hydroxy diphenyl has been prepared according to the method hereinbefore set forth and the reaction product found to possess the wetting and penetrating qualities typical of the class, when employed in conjunction with latex.

The specific examples set forth above demonstrate the fact that the new and preferred class of materials possess exceptionally valuable wetting and penetrating properties when employed in conjunction with latex. Other members of the new class of wetting agents as disclosed above have been found on actual testing to possess the typical wetting and penetrating characteristics. Other soluble salts than the sodium salt specifically disclosed may be employed. Thus the calcium salts may be so employed. It is preferable, however, that the salts of the alkali-metals be used in carrying out the present invention.

By the term "hydroxy substituted diaryl", as appearing in the present specification and claims, is meant a compound composed of two aromatic nuclei joined together through a carbon atom of each by means of a single bond, said compound containing one or more hydroxy substituents.

The present invention is limited solely by the following claims.

What is claimed is:

1. The process of treating latex characterized by the employment of a soluble salt of a sulfuric acid derivative of the reaction product of an alcohol and a hydroxy substituted diaryl.

2. The process of treating latex characterized by the employment of an alkali-metal salt of a sulfuric acid derivative of the reaction product of an aliphatic alcohol and a hydroxy substituted diaryl.

3. The process of treating latex characterized by the employment of a soluble salt of a sulfuric acid derivative of the reaction product of an alcohol and a hydroxy substituted diphenyl.

4. The process of treating latex characterized by the employment of an alkali-metal salt of a sulfuric acid derivative of the reaction product of an alcohol and a hydroxy substituted diphenyl.

5. The process of treating latex characterized by the employment of an alkali-metal salt of a sulfuric acid derivative of the reaction product of butyl alcohol and a hydroxy substituted diphenyl.

6. The process of treating latex characterized by the employment of an alkali-metal salt of a sulfuric acid derivative of the reaction product of normal butyl alcohol and an ortho hydroxy substituted diphenyl.

7. The process of treating latex characterized by the employment of the sodium salt of a sulfuric acid derivative of the reaction product of normal butyl alcohol and an ortho hydroxy substituted diphenyl.

8. The process of treating latex characterized by the employment of the sodium salt of a sulfuric acid derivative of the reaction product of normal butyl alcohol and a mixture of ortho and para hydroxy diphenyl.

9. The process of treating latex characterized by the employment of the sodium salt of a sulfuric acid derivative of the reaction product of normal butyl alcohol and a mixture of substantially 85% ortho hydroxy diphenyl and substantially 15% para hydroxy diphenyl.

10. The process of treating latex characterized by the employment of the sodium salt of a sulfuric acid derivative of the reaction product of normal amyl alcohol and a mixture of substantially 85% ortho hydroxy diphenyl and substantially 15% para hydroxy diphenyl.

11. The process of treating latex characterized by the employment of the sodium salt of a sulfuric acid derivative of the reaction product of normal butyl alcohol and a mixture of substantially 85% ortho hydroxy diphenyl and substantially 15% para hydroxy diphenyl, in conjunction with a liquid alcohol.

12. The process of treating latex characterized by the employment of the sodium salt of a sulfuric acid derivative of the reaction product of normal butyl alcohol and a mixture of substantially 85% ortho hydroxy diphenyl and substantially 15% para hydroxy diphenyl, in conjunction with butyl alcohol.

13. A composition of matter comprising latex and a soluble salt of a sulfuric acid derivative of the reaction product of an alcohol and a hydroxy substituted diaryl.

14. A composition of matter comprising latex and an alkali-metal salt of a sulfuric acid derivative of the reaction product of an aliphatic alcohol and a hydroxy substituted diaryl.

15. A composition of matter comprising latex and a soluble salt of a sulfuric acid derivative of the reaction product of an alcohol and a hydroxy substituted diphenyl.

16. A composition of matter comprising latex and an alkali-metal salt of a sulfuric acid derivative of the reaction product of an alcohol and a hydroxy substituted diphenyl.

17. A composition of matter comprising latex and an alkali-metal salt of a sulfuric acid derivative of the reaction product of butyl alcohol and a hydroxy substituted diphenyl.

18. A composition of matter comprising latex and an alkali-metal salt of a sulfuric acid derivative of the reaction product of normal butyl alcohol and an ortho hyroxy substituted diphenyl.

19. A composition of matter comprising latex and the sodium salt of a sulfuric acid derivative of the reaction product of normal butyl alcohol and an ortho hydroxy substituted diphenyl.

20. A composition of matter comprising latex and the sodium salt of a sulfuric acid derivative of the reaction product of normal butyl alcohol and a mixture of ortho and para hydroxy diphenyl.

21. A composition of matter comprising latex and the sodium salt of a sulfuric acid derivative of the reaction product of normal butyl alcohol and a mixture of substantially 85% ortho hydroxy dihpenyl and substantially 15% para hydroxy diphenyl.

22. A composition of matter comprising latex and the sodium salt of a sulfuric acid derivative of the reaction product of normal amyl alcohol and a mixture of substantially 85% ortho hydroxy diphenyl and substantially 15% para hydroxy diphenyl.

23. A composition of matter comprising latex and the sodium salt of a sulfuric acid derivative of the reaction product of normal butyl alcohol and a mixture of substantially 85% ortho hydroxy diphenyl and substantially 15% para hydroxy diphenyl, in conjunction with a liquid alcohol.

24. A composition of matter comprising latex and the sodium salt of a sulfuric acid derivative of the reaction product of normal butyl alcohol and a mixture of substantially 85% ortho hydroxy diphenyl and substantially 15% para hydroxy diphenyl, in conjunction with butyl alcohol.

ROBERT L. SIBLEY.